Jan. 23, 1934.  M. J. COHAN  1,944,860
SOLDERING TOOL
Filed Dec. 8, 1930
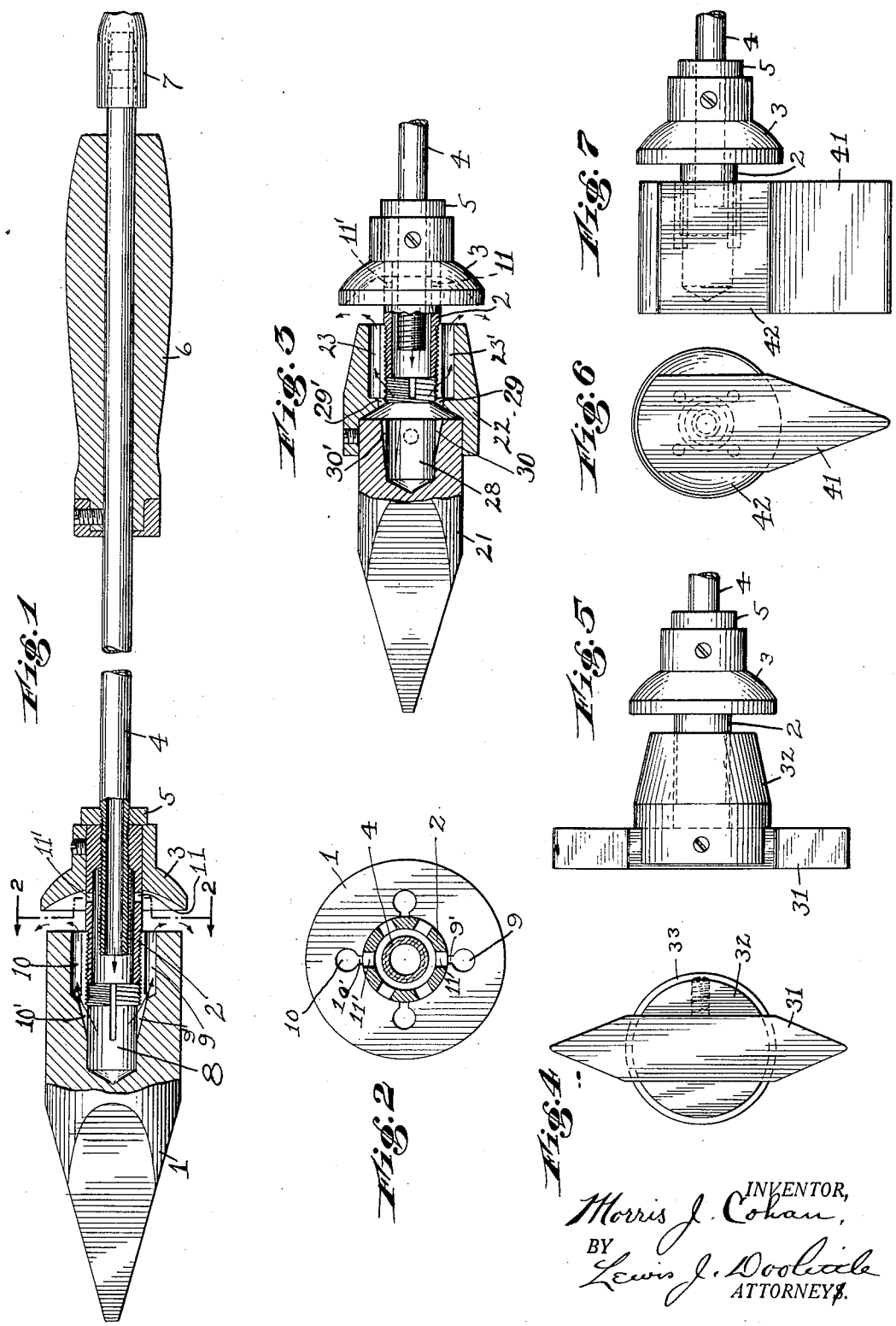
INVENTOR,
Morris J. Cohan,
BY Lewis J. Doolittle
ATTORNEYS.

Patented Jan. 23, 1934

1,944,860

UNITED STATES PATENT OFFICE 1,944,860

SOLDERING TOOL

Morris J. Cohan, Brooklyn, N. Y., assignor to Reliance Specialties Manufacturing Co., Inc., New York, N. Y., a corporation of New York Application December 8, 1930. Serial No. 500,761

4 Claims. (Cl. 158—26)

This invention relates to a device known as a soldering tool and more particularly to such a device in which a gas flame is utilized as the heating medium to impart the desired heat to the soldering head.

The object of the invention is to provide a device of simple construction composed of a relatively small number of parts and which may be easily and cheaply constructed and readily assembled. In conformity with this general object, the several parts have been designed to produce a device of great efficiency, in which the heating is effected with a minimum loss, due to dissipation, and the combustion of the gas takes place interiorly of the soldering head and adjacent to the operating portion of the same.

A further object is to provide for the ready removal of the soldering head, for replacement or repair, or for the inter-change of soldering heads of varying size or shape, designed for special purposes, etc.

A further object is the provision of a construction in which the soldering head may be removed and the remaining parts utilized as a torch, for applying the gas flame to parts where it may be desired, for various purposes which will be apparent.

In the drawing, in which is illustrated one embodiment of the invention and some modifications thereof, like parts in the several views have been given the same reference numeral.

Fig. 1 is a side elevation, partly in section, of a soldering tool embodying the invention; Fig. 2 is a sectional view taken on the line 2—2 of Fig. 1; Fig. 3 is a sectional view, similar to Fig. 1, of one end thereof, showing a modification of the means for attaching the soldering head.

Figs. 4 and 5 are end and side views, respectively, of different form of soldering head and means for attachment.

Figs. 6 and 7 are end and side views, respectively, of another form of soldering head and means for attachment.

Referring to Figs. 1 and 2, a soldering head is shown at 1. This head is usually of copper and its outer end tapered into the desired form for soldering. The inner end of the head 1 is recessed and threaded for mounting upon a tubular nipple 2. A deflector 3 is mounted upon the opposite end of the nipple 2, being adjustably secured in a predetermined position thereupon by means of a set screw, or otherwise.

A gas supply pipe 4 is threaded into the end of the nipple 2, the end of the gas supply pipe extending into a recess of somewhat larger diameter than the outside of the pipe in the opposite end of the nipple 2, this recess forming a mixing chamber for the gas and air, as will be explained hereinafter. A lock nut 5 threaded on the pipe 4 holds the nipple 2 in position on the end of said pipe. A handle 6 may be suitably secured on the opposite end of the pipe 4 and the pipe connected by means of a flexible tubing 7 to a suitable gas supply, as will be understood.

As hereinbefore stated, the soldering head 1 is recessed to provide a combustion chamber 8, which chamber is extended inwardly of the inner end of the tubular nipple 2 adjacent the operating portion of the head 1 in order to shorten the distance from the heating flame to the operating portion of the head. A suitable number of exhaust vents, such as indicated and shown at 9 and 10, extend inwardly from the rear end of the head 1 and are connected to and communicate by means of slots, indicated and shown at 9' and 10', with the combustion chamber 8.

A number of air vents, indicated at 11 and 11', are provided through the wall of the tubular nipple 2 and located inwardly of the inner end of the gas pipe 4 extending thereinto and adjacent the deflector 3. These vents may be partly or entirely closed by sliding and adjusting the deflector 3 on the tubular member 2, as will be seen in Fig. 1.

In the modification shown in Fig. 3, provision is made for the use of a smaller soldering head, indicated at 21, with the same gas supply handle and associated parts. In this form, a socket member 22 is supplied which is recessed to receive the smaller soldering head 21 and also threaded at its opposite end for mounting upon the tubular nipple 2, carried by the gas supply pipe 4, the nipple 2 being provided with air vents 11 and 11', as heretofore described in connection with the arrangement shown in Fig. 1. This socket member 22 is provided with vents, as indicated at 23 and 23', and slots, indicated at 29 and 29', communicating with a combustion chamber 28 in the soldering head 21, which may also be provided with slots, indicated at 30 and 30', these vents being similar to the vents 9 and 10 and slots 9' and 10' in the construction shown in Fig. 1, heretofore described.

In the modification shown in Figs. 4 and 5, a soldering head 31 of rectangular shape, with V-shaped end portions, is mounted in a slot in the end of a socket member 32, which socket member is mounted upon the tubular nipple 2 in a like manner and constructed interiorily the same as the socket member 22 shown and described in connection with the modification of Fig. 3.

In the modifications shown in Figs. 6 and 7, a soldering head 41 of an angular V-shaped construction is mounted upon the end of the tubular nipple 2 in a like manner and constructed interiorly the same as the soldering head 1, heretofore described and shown in Figs. 1 and 2.

It will thus be seen that provision is made for easily removing the soldering head from the device and for interchanging soldering heads of different sizes or shapes, thus enabling the operator to use the device for various purposes. The forms of soldering head shown in Figs. 1, 2 and 3 are for general purposes, while that shown in Figs. 4 and 5 is more adapted for seam soldering and that in Figs. 6 and 7 for inside soldering, in a cylindrical article, etc.

It will be noted that the removal or change of the several forms or shapes of soldering head is easily accomplished and requires no special tools to manipulate the parts, enabling the same handle and gas supply parts to be used upon work of different character and the change made without loss of time.

A further use of the device may also be provided by simply removing the soldering head 1 from the nipple 2 and then utilizing the remaining parts as a torch for general purposes, as may be desired.

The deflector 3 not only protects the operator from any "back-fire" heat or flame issuing from the vents 9 and 10 but also throws the flame and heat back upon the soldering head 1 and, also, provides a heated atmosphere around the vents 11—11'. This is not only advantageous in producing a more efficient gas-air mixture but, on account of the arrangement of the gas tube in the mixing chamber, any unconsumed gases issuing from the vents is drawn back into the mixing and combustion chamber, as will be understood by reference to Fig. 1.

It is also evident from Fig. 1 that by varying the distance from the deflector 3 to the exhaust vents 9—10 the effectiveness of the action of said deflector will be varied, thereby varying also the intensity of the heat of the soldering head 1.

What I claim as new and desire to secure by Letters Patent is:—

1. A soldering tool comprising a soldering head provided with a combustion chamber extending inwardly toward and adjacent the operating portion of the head and provided with rearwardly discharging exhaust vents embodied in and opening from the opposite end of said head, a nipple removably secured to said soldering head and provided with a mixing chamber communicating with said combustion chamber in the soldering head, a gas supply pipe attached to said nipple for supplying gas to said mixing chamber, and a deflector adjustably mounted on said nipple positioned adjacent and shaped to extend over the discharge from the openings of said vents from said combustion chamber and adapted to throw back the flame and heat upon the soldering head thereby varying the intensity of the heat of said soldering head.

2. A soldering tool comprising a soldering head provided with a combustion chamber, a nipple removably secured to said soldering head and provided with a mixing chamber communicating at one end with said combustion chamber in the soldering head and provided with air vents at its opposite end, a gas supply pipe attached to said nipple for supplying gas to said mixing chamber, and a deflector adjustably and slidably mounted on said nipple and adapted to partly or entirely close said air vents and also to collect and provide a heated atmosphere around the inlets of said vents.

3. A soldering tool comprising a soldering head provided with a combustion chamber extending inwardly toward and adjacent the operating portion of the head and provided with rearwardly discharging exhaust vents embodied in and opening from said head at its opposite end, a nipple removably secured to said soldering head and provided with a mixing chamber communicating with said combustion chamber in the soldering head, said exhaust vents being disposed substantially parallel to the axis of said nipple and said nipple having air vents therein communicating with said mixing chamber and disposed substantially radially with relation to said nipple, a gas supply pipe attached to said nipple for supplying gas to said mixing chamber, and a deflector adjustably mounted on said nipple adjacent and extending over the discharge openings of said vents from said combustion chamber and adapted to throw back the flame and heat upon the soldering head, thereby varying the intensity of the heat of said soldering head and increasing the efficiency of the device.

4. A soldering tool comprising a soldering head provided with a combustion chamber extending adjacent the operating portion or end of said head, a tubular nipple removably secured to said soldering head and provided with a mixing chamber communicating at one end with said combustion chamber in the soldering head and provided with air vents at its opposite end, and a gas supply pipe attached to said nipple and extending into said nipple to a point beyond said air vents to said mixing chamber, means for adjusting the position of said gas supply pipe in said chamber, said means comprising a lock-nut in threaded engagement with the exterior of said pipe and abutting against the outer end of said tubular nipple, the outside diameter of said gas supply pipe being smaller than the inside dimension of said mixing chamber into which it extends.

MORRIS J. COHAN.